United States Patent
Ono et al.

(10) Patent No.: US 7,665,856 B2
(45) Date of Patent: *Feb. 23, 2010

(54) IMAGING DEVICE

(75) Inventors: Shinji Ono, Nagoya (JP); Teruaki Nabeno, Nagoya (JP)

(73) Assignee: Elmo Company Limited (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/257,816

(22) Filed: Oct. 24, 2008

(65) Prior Publication Data

US 2009/0161365 A1 Jun. 25, 2009

(30) Foreign Application Priority Data

Dec. 25, 2007 (JP) .............................. 2007-331777

(51) Int. Cl.
G03B 15/00 (2006.01)
F21V 7/00 (2006.01)

(52) U.S. Cl. .......................... 362/11; 362/241; 362/247; 362/249.06; 362/249.14

(58) Field of Classification Search ...................... 362/3, 362/8, 11, 249.01, 249.02, 249.06, 249.14, 362/237, 240, 241, 247, 297, 346; 355/67, 355/70; 396/429, 431
See application file for complete search history.

(56) References Cited

U.S. PATENT DOCUMENTS 4,893,223 A * 1/1990 Arnold ........................ 362/11
4,974,927 A 12/1990 Kimura
5,038,258 A * 8/1991 Koch et al. ................... 362/237
5,734,417 A 3/1998 Yamamoto et al.
6,689,999 B2 * 2/2004 Haines et al. ............... 250/205
6,929,375 B2 * 8/2005 Satomi ........................ 362/11
2007/0003274 A1 1/2007 Sukenari

FOREIGN PATENT DOCUMENTS

EP 0 243 089 10/1987
JP 60-201678 10/1985

OTHER PUBLICATIONS

UK Search Report issued in corresponding UK patent application No. GB0819779.0 (Date of Search Feb. 13, 2009).

* cited by examiner

Primary Examiner—Thomas M Sember
(74) Attorney, Agent, or Firm—Ostrolenk Faber LLP

(57) ABSTRACT

To achieve both uniform illumination and a reduction in the LED light sources, after simplifying illumination control of the light sources. In an illumination unit 130, when arranging LED light sources in a linear arrangement on a light source base plate 160, installation thereof will be thinned out in the center, while providing the base plate left and right ends with LED light sources 160L1 and L2 and LED light sources 160R1 and R2. The light emitted by the LED light source 160L1 and the LED light source 160R1 will be reflected by a left inside wall face 131LS and a right inside wall face 131RS respectively, and directed onto the table upper face. The light emitted by the LED light source 160L2 and the LED light source 160R2 lying towards the center zone of the light source array where the light source placement has been thinned out will be reflected by a left outside wall face 171LS and a right outside wall face 171RS respectively, and directed onto the table upper face.

5 Claims, 7 Drawing Sheets

IMAGING DEVICE

CROSS-REFERENCE TO RELATED APPLICATIONS

The present application claims the priority based on Japanese Patent Application No. 2007-331777 filed on Dec. 25, 2007, the disclosure of which is hereby incorporated by reference in its entirety.

BACKGROUND

1. Technical Field

The present invention relates to an image device adapted to simultaneously illuminate and image a imaging-object mounted on a table.

2. Related Art

An imaging device of this kind will typically be equipped with an illumination unit intended to be employed when the imaging-object which has been mounted on a table is being imaged by a camera of a camera head, in order augment the quantity of light during the imaging process. Such illumination units are encountered, for example, in Japanese Patent Laid-open Gazette 2003-209717 and Japanese Patent No. 3682285. Illumination units in conventional devices are furnished with a large number of low-luminance light-emitting diodes (LEDs) to provide uniform illumination over a wide area of the table, however, the use of such a large number of LEDs contributes to more complicated wiring schemes, as well as posing the problem of laborious maintenance.

Also, in imaging devices of this kind, the illumination unit is composed of light-emitting diodes (LEDs) arranged in a line at equal pitch, with the light of each LED being directed onto the table upper face to illuminate it.

However, where light is directed in the same way from each LED of an array of LEDs that have been arranged in a line at equal pitch, differences in brightness may arise between the table center area and areas to the sides thereof on the table upper face, and uneven brightness may occur in the area being imaged by the camera head as well. For this reason, in Japanese Patent No. 3682285, it is proposed to reduce uneven brightness by using an illumination unit that has large number of LEDs arrayed in a line along a prescribed length, and to carry out control whereby all of the LED are lit at once, as well as on/off control of LEDs according to the extent of uneven brightness.

However, as such on/off control of LEDs according to the extent of uneven brightness necessitates measurement of uneven brightness, the complexity of doing so must be pointed out. Moreover, while the complexity of control can be reduced by illuminating all of the LEDs at once, due to the need to arrange a large number of LEDs in a line along a prescribed length, problems were encountered in terms of an increased number of parts and higher power consumption.

SUMMARY

It is accordingly one object of the present invention to address such problems with a view to achieving both uniform illumination and a reduction in the LED light sources, after simplifying illumination control of the light sources.

In order to solve at least a part of these problems stated above, the present invention uses the following constitution.

An imaging device comprising:

a camera unit for imaging an area of a table on which an imaging-object is to be mounted, and an illumination unit for illuminating a table upper face during imaging; wherein the illumination unit includes:

a plurality of light sources composed of light emitting diodes disposed as a light source array on a base plate such that light will be directed onto the table upper face, with the plurality of light sources being positioned on the base plate such that, in a center light source array zone and in light source array zones to left and right of the center light source array zone of the light source array, the placement frequency of the light sources in the left and right light source array zones is higher than the placement frequency in the center light source array zone.

In the above imaging device, the illumination unit further includes:

end reflector plates projecting from the base plate and adapted to reflect towards the table upper face light that is emitted towards the outside of the table upper face by light sources situated at the ends of the left and right light source array zones; and center end reflector plates projecting from the base plate at the ends of the center light source array zone and adapted to reflect towards the table upper face light that is emitted towards the outside of the table upper face beyond the table center zone of the table upper face by light sources situated to the outside of the center light source array zone.

According to the imaging device of the above constitution, the illumination unit emits light towards the table upper face from LED light sources that are arrayed in a light source array on the base plate, thus illuminating table upper face. When illumination is carried out in this way, while the illumination unit in the imaging device of the above constitution has LED light sources arranged in the light source array on the base plate, the placement frequency of the LED light sources is lower in the center light source array zone of the light source array, while the placement frequency of the LED light sources is higher in the light source array zones to the left and right of the center light source array zone. Additionally, light emitted towards the outside of the table upper face by LED light sources that are situated at either end of the left and right light source array zones will be reflected back by the end reflector plates that project from the base plate, and become directed onto the table upper face. Thus, the quantity of light reaching the table upper face can be increased.

Meanwhile, the placement frequency of the LED light sources is lower in the center light source array zone of the light source array, while the placement frequency of the LED light sources is higher in the light source array zones to the left and right of this center light source array zone, so if no additional measures are taken, light from the LED light sources included in the left and right light source array zones will cross and reach the center zone of the table upper face and the surrounding area, so that a considerable quantity of light will reach the table center zone. For this reason, in the illumination unit in the imaging device of the above constitution, for those LED light sources that are situated to the outside of center light source array zone of the light source array, the light that the light sources emit towards the outside of the table upper face beyond the table center zone will be reflected back by the center end reflector plates which project from the base plate at the ends of the center light source array zone of the light source array, and will be directed onto the table upper face. Thus, some of light directed towards the table center zone from the LED light sources of the left and right light source array zones having higher placement frequency of the LED light source will be directed onto the table upper face away from the table center zone. As a result, in conjunction with directing of light emitted by the LED light sources at the ends of the linear light source array towards the table upper face from the outside of the table upper face, it will be possible to produce more uniform brightness of the table upper face. Moreover, since this more uniform brightness can be achieved despite the lower placement frequency of the LED light sources in the center light source array zone, the number of parts can be reduced commensurately with the reduction in the placement frequency, which contributes to power savings as well. Additionally, since on/off control of the LED light source is not needed, control is simple.

It is possible to use various modes for the imaging device described above. For example, the number of parts could be reduced even further by not providing any light sources in the center light source array zone having lower placement frequency of light sources in the illumination unit.

When arraying the light sources on the base plate to produce the light source array, the light source array can be of linear form wherein the light sources are arrayed in a row.

In another possible mode, the illumination unit includes a recess-forming body covering the base plate and open to the front side of the light sources of the base plate, and a housing that has a light transmission window facing the recess opening of the recess-forming body, and the recess-forming body includes the end reflector plates at either side of the base plate as the recess side walls of the recess-forming body, with the upper and lower wall faces of the recess opening are reflecting faces. By so doing, reflected light reflected at the upper and lower wall faces of the recess opening will pass through the light transmission window and reach the table upper face, thus ensuring sufficient quantity of light and advantageously producing more uniform brightness.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
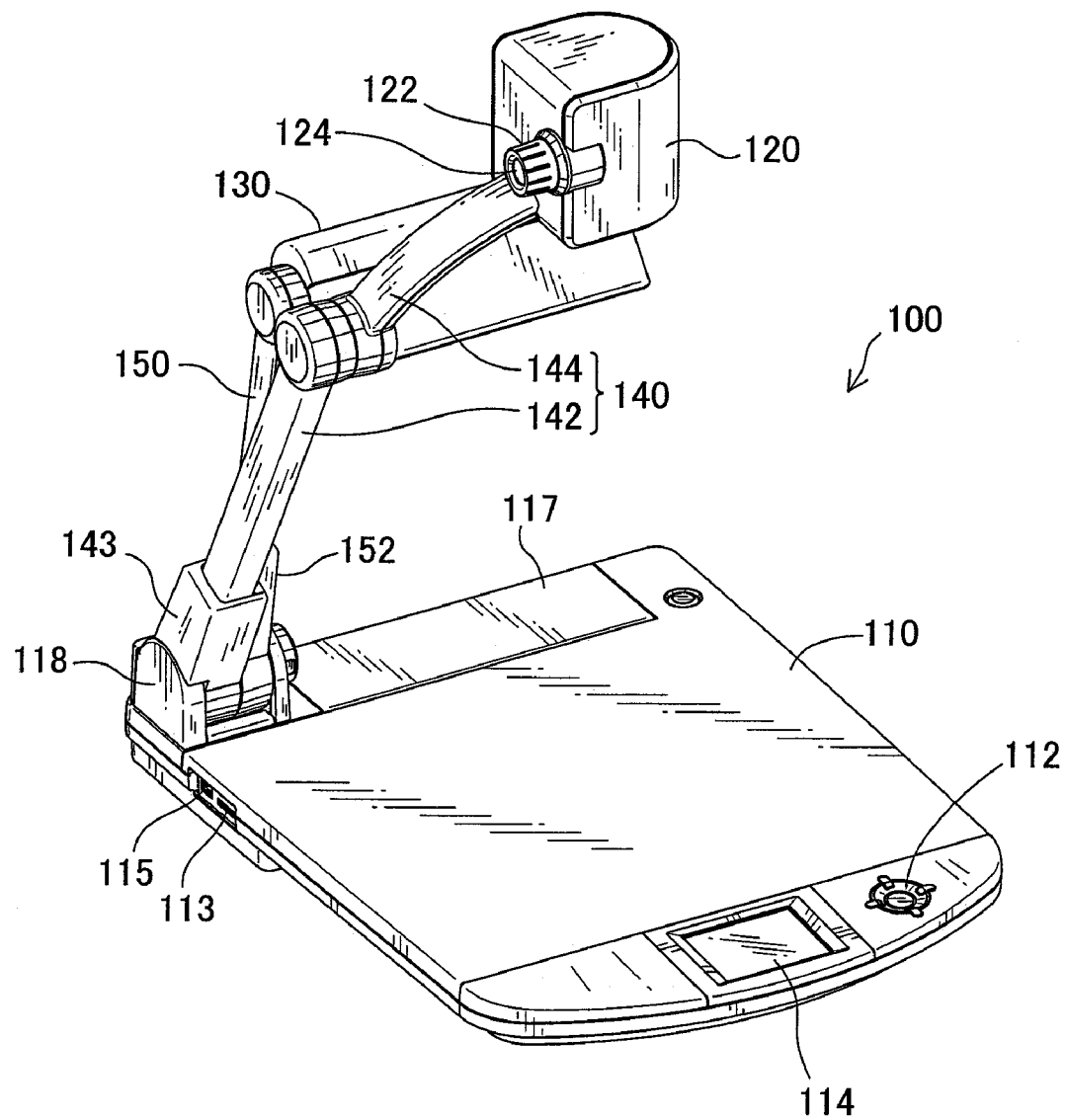
FIG. 1 is a perspective view of an imaging device 100 of the embodiment.
Figure 2:
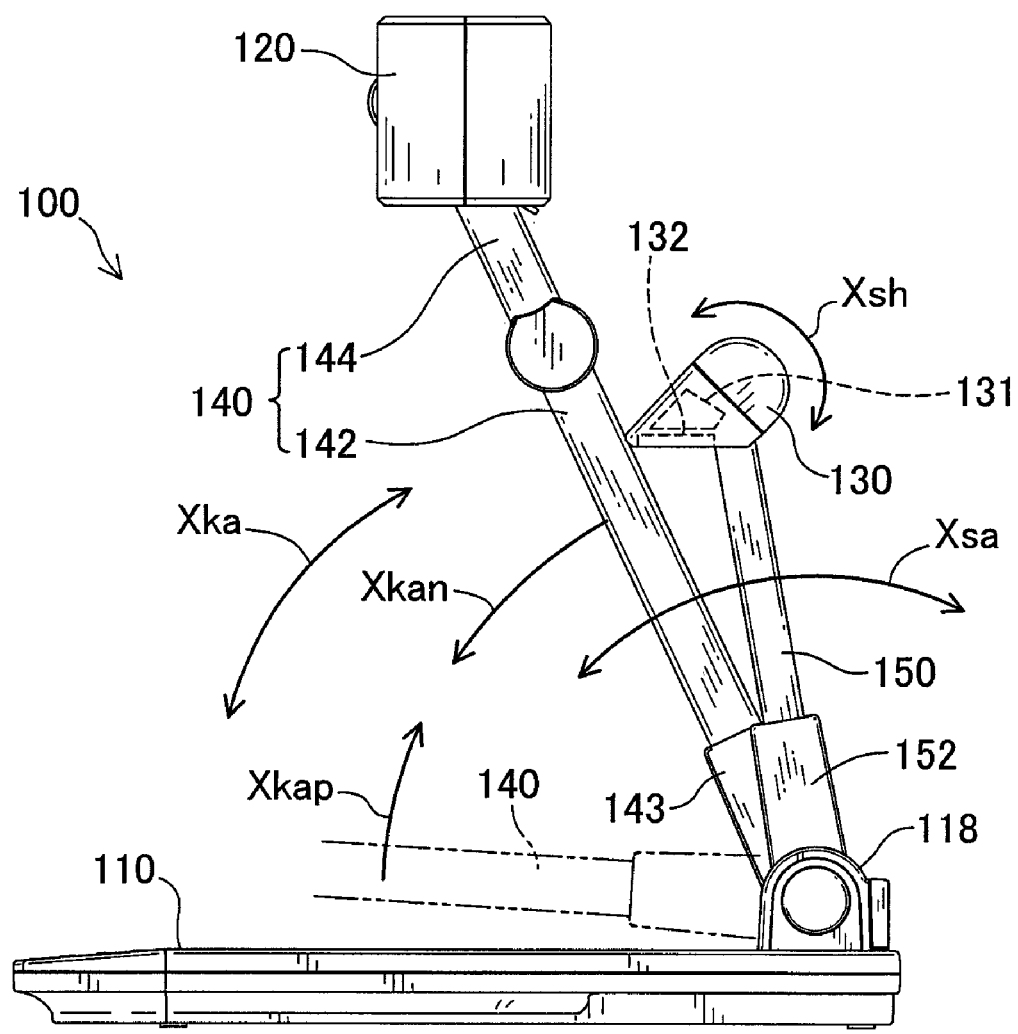
FIG. 2 is a right side view of the imaging device 100.

The following describes modes for embodying the present invention in terms of examples based on drawings. FIG. 1 is a perspective view of an imaging device 100 of the embodiment, and FIG. 2 is a right side view of the imaging device 100.

As shown in the drawing, the imaging device 100 includes a table 110 on which the imaging-object is mounted, a camera head 120 for imaging the imaging-object (not illustrated) on this table 110, and a lighting unit 130 for lighting the imaging-object on the table 110. The table 110 forms a rectangular flat plate shape for which the front side has a rounded extension, includes a switch group 112 and a monitor 114 at the top surface of the front side, and further includes a memory card mounting mechanism 113 and a USB (Universal Serial Bus) terminal 115 at the left back side wall. This switch group 112 switches the lights on and off, and of the monitor display source, displays switching of the menu screen displayed on the monitor 114, and additionally has a switching function for the function settings of this device and the like, but it has no direct relation to the key points of the present invention, so the description of these structure is not discussed here.

Also, the table 110 includes a cover 117 that can open and close freely on the top surface of the table at the table back end side, and using this cover, the connector terminal group (not illustrated) for connection with external devices are covered and hidden. The cover 117 is opened and closed in flap form, and with the illustrated closed state, it becomes substantially a single surface with the table top surface of the table 110, and the surface of the cover part is a surface that is continuous with the table top surface.

The camera head 120 is held by the camera holding arm 140 in relation to the table 110. This camera holding arm 140 includes a table side arm 142 and a camera side arm 144, and is held to rotate on the table 110 at the base 143 of the table side arm 142. The camera side arm 144 is linked and fixed with the camera head 120, and is respectively free to rotate at the linking part with the table side arm 142. Thus, the camera head 120 is integrated with the camera side arm 144 and is able to rotate at the tip of the table side arm 142.

Also, the camera head 120 has a built in camera (not illustrated), and includes a zoom operating switch 122 and an auto focus switch 124, which are regularly used when imaging the imaging-object, at the side surface. The zoom operating switch 122 is installed so as to encompass the auto focus switch 124, and decides the user's desired zoom level according to the forward/reverse turning operation by the user. The auto focus switch 124 is constituted as a pressing switch, whereby normally the auto focus is off, and the auto focus operation is executed by a pressing operation by the device user.

The lighting unit 130 is held by a lighting unit holding arm 150 in relation to the table 110. This lighting unit holding arm 150 is held so as to rotate on the table 110 at the base 152, and the lighting unit 130 is held so as to rotate at the tip side.

The camera holding arm 140 and the lighting unit holding arm 150 are axially supported on the same shaft to be able to rotate at the left inner corner ridge part 118 of the table 110, and so that the level of inclination in relation to the table 110 changes, turn on the same shaft in relation to the table 110. The imaging device 100 has an arm that is axially supported to be able to rotate in this way, so it is possible to use various modes with arm rotating. Here, before describing the constitution of the rotating shaft support of both arms, we will give a brief description of various modes that can be used for the imaging device 100.

From the aforementioned both arm shaft support state and the lighting unit 130 shaft support state, as shown in FIG. 2, the camera holding arm 140 rotates so that the inclination level in relation to the table 100 changes as shown by the arrow Xka in the drawing, and from the state shown by the solid line in this FIG. 2, the camera head 120 is able to turn up to the state approaching the top surface of the table 110. The camera head 120 has the stance (imaging stance) shown in FIG. 1 and FIG. 2 during imaging the imaging-object mounted on the table 110, and the imaging-object mounted on the table 110 is imaged from the top side of the table. The camera side arm 144 is rotatable with respect to the table side arm 142, and with the table side arm 142 rotated towards the table upper face, the camera head 120 will rotate into proximity with the table upper face 110. If the camera support arm 140 has been inclined to the minimum angle towards the table, it will be retained in that position subsequent to rotation by a restraining mechanism (not shown). On the other hand, with the camera head 120 in the imaging position shown in FIG. 2, rotation of the camera support arm 140 will be restricted by a stopper (not shown) of the pivoted support design so that the camera support arm 140 assumes the largest incline (maximum incline) with respect to the table 110.

The lighting unit holding arm 150 rotates so that the inclination level changes in relation to the table 110 as shown by the arrow Xsa in FIG. 2, and from the state shown in this FIG. 2, it is possible to rotate up to the state of the lighting unit 130 approaching the top surface of the table 110. Also, the lighting unit holding arm 150 can rotate until the lighting unit 130 is at a position behind the position shown in FIG. 2. The lighting unit 130 rotates as shown by the arrow Xsh in the drawing at the linking part with the lighting unit holding arm 150. In this case, during imaging of the imaging-object mounted on the table 110, the lighting unit holding arm 150 is positioned at the back side from the camera holding arm 140, and the lighting unit 130 normally has the stance (lighting stance) shown in the drawing behind the camera head 120, and lights the imaging-object mounted on the table 110 at a diagonal from the top side of the table. During this time the illumination unit 130 may be rotated at the linkage thereof to the illumination unit support arm 150, to direct the light emitted from an internal light source housing portion 131 (discussed later) through a light transmissive window 132 so as to illuminate the table upper face.

Figure 3:
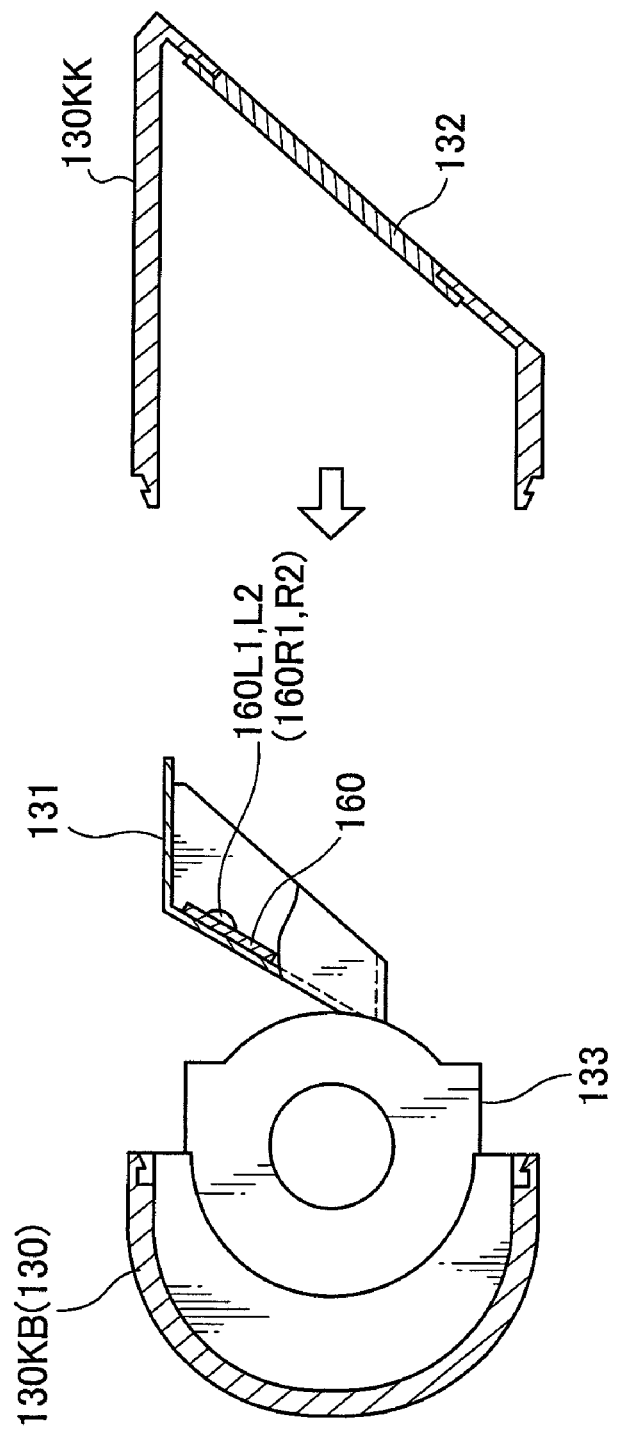
FIG. 3 is an illustration depicting an illumination unit 130 in sectional view.
Figure 4:
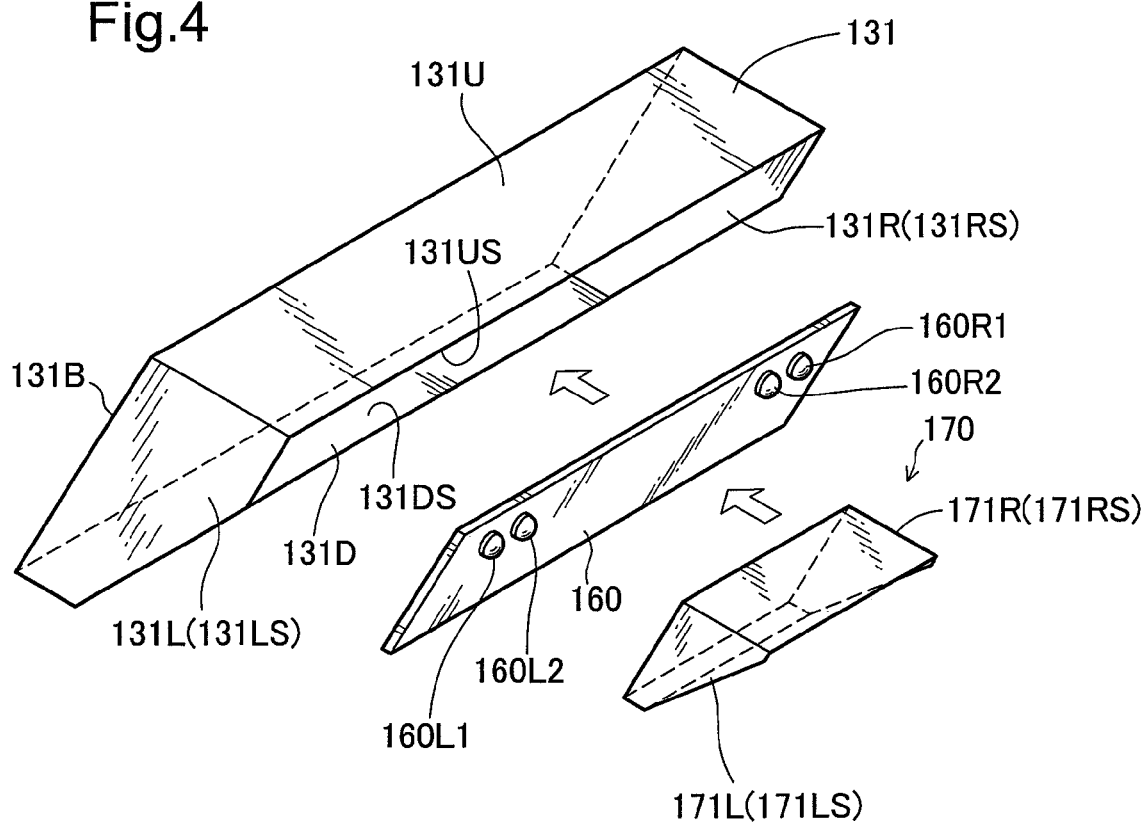
FIG. 4 is a schematic illustration in exploded view of the illumination unit 130.
Figure 5:
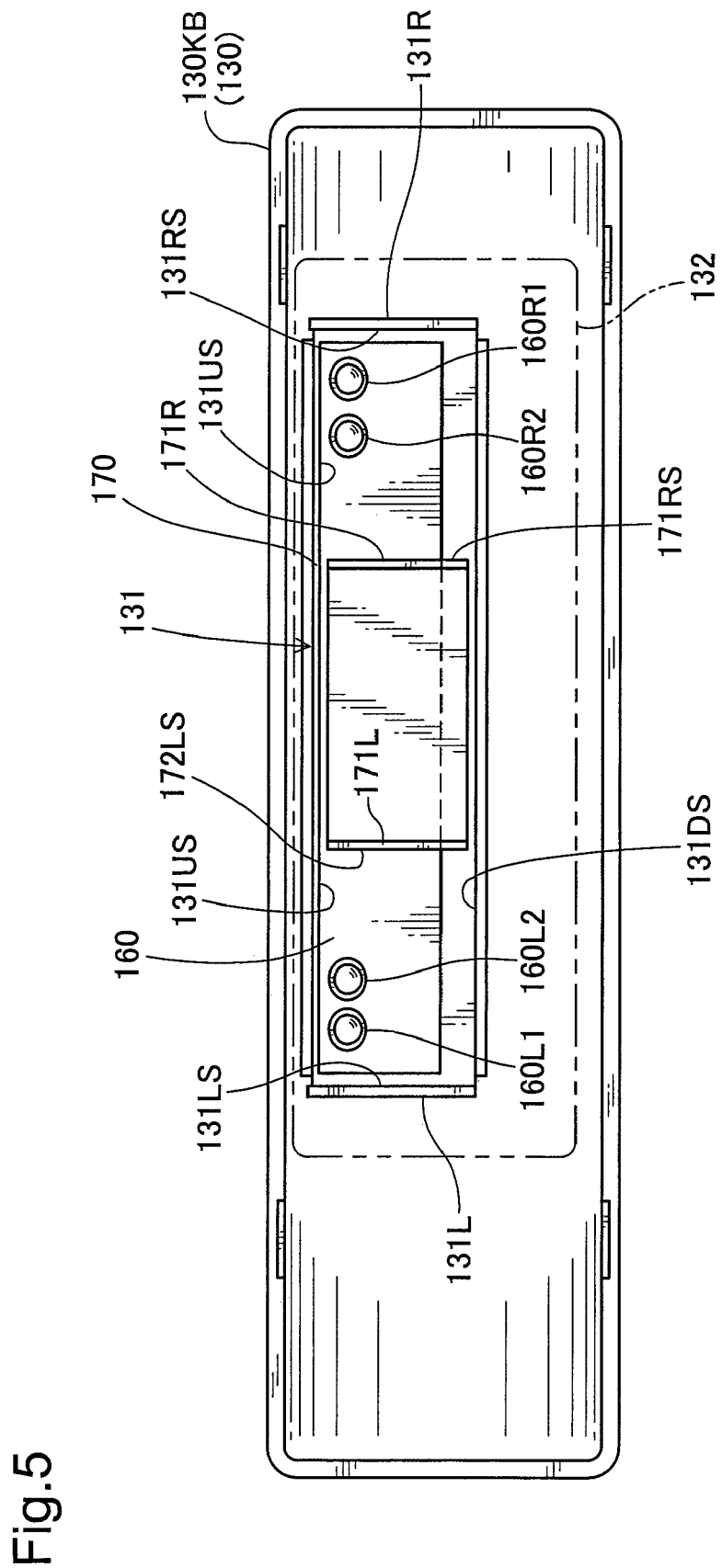
FIG. 5 is an illustration depicting the illumination unit 130 in front view with the cover removed.

Next, the illumination unit 130 will be discussed in detail. FIG. 3 is an illustration depicting an illumination unit 130 in sectional view, FIG. 4 is a schematic illustration in exploded view of the illumination unit 130, and FIG. 5 is an illustration depicting the illumination unit 130 in front view with the cover removed.

The illumination unit 130 is a housing of a front body 13OKK attached to a rear body 13OKB that has a generally semicircular cross section, with a light source housing portion 131 housed in the interior of the housing. The light transmissive window 132 is provided in the sloping front face of the front body 13OKK. As shown in FIG. 5, this window 132 is formed over a larger area than the light source housing portion 131, and transmits the light emitted by the light source housing portion 131 onto the table top face.

The light source housing portion 131 is attached to a rotating support body 133 for the purpose of rotational operation at the linkage with aforementioned illumination unit support arm 150, in such a way as to face towards the window 132 from the support body 133. This light source housing portion 131 has a recessed shape open at the front, and is defined at the left and right of a base 131B by a left wall 131L and a right wall 131R, and above and below it by an upper wall 131U and a lower wall 131D, which have been bent so to enclose the base 131B. The inside faces of these four walls, i.e. a left inside wall face 131LS, a right inside wall face 131RS, an upper inside wall face 131US, and a lower inside wall face 131DS, are each white in color, and these inside wall faces function as reflecting faces.

The light source housing portion 131 of recessed shape is fastened at its base 131B to a light source base plate 160. Thus, the aforementioned left wall 131L, right wall 131R, upper wall 121U, and lower wall 131D of the light source housing portion 131 will project towards the window 132 from the light source base plate 160. As shown in FIGS. 4 and 5, the light source base plate 160 is provided with LED light sources 160L1 and L2 and with LED light sources 160R1 and R2, situated at the left and right end sides of the base plate in front view. These LED light sources are arranged on the light source base plate 160 as a linear light source array so as to emit light towards the table upper face 110, and since they are situated only at the left and right ends of the light source array, the placement frequency of the LED light sources in the center zone of the light source array will be lower than that at the left and right ends of the light source array.

The light source housing portion 131 is also provided with a reflector 170 of recessed shape disposed in the center zone of the light source array where the light source placement frequency is lower as noted above. This reflector 170 is fastened with screws (not shown) to the light source base plate 160, so that a left wall 171L and a right wall 171R to left and right project towards the window 132 from the light source base plate 160 and are situated in opposition to the left wall 131L and the right wall 131R of the light source housing portion 131, with the aforementioned LED light sources respectively disposed therebetween. The outside wall face of the left and right walls of the reflector 170, namely, a left outside wall face 171LS and a right outside wall face 171RS, are each white in color, and these outside wall faces function as reflecting faces.

Figure 6:
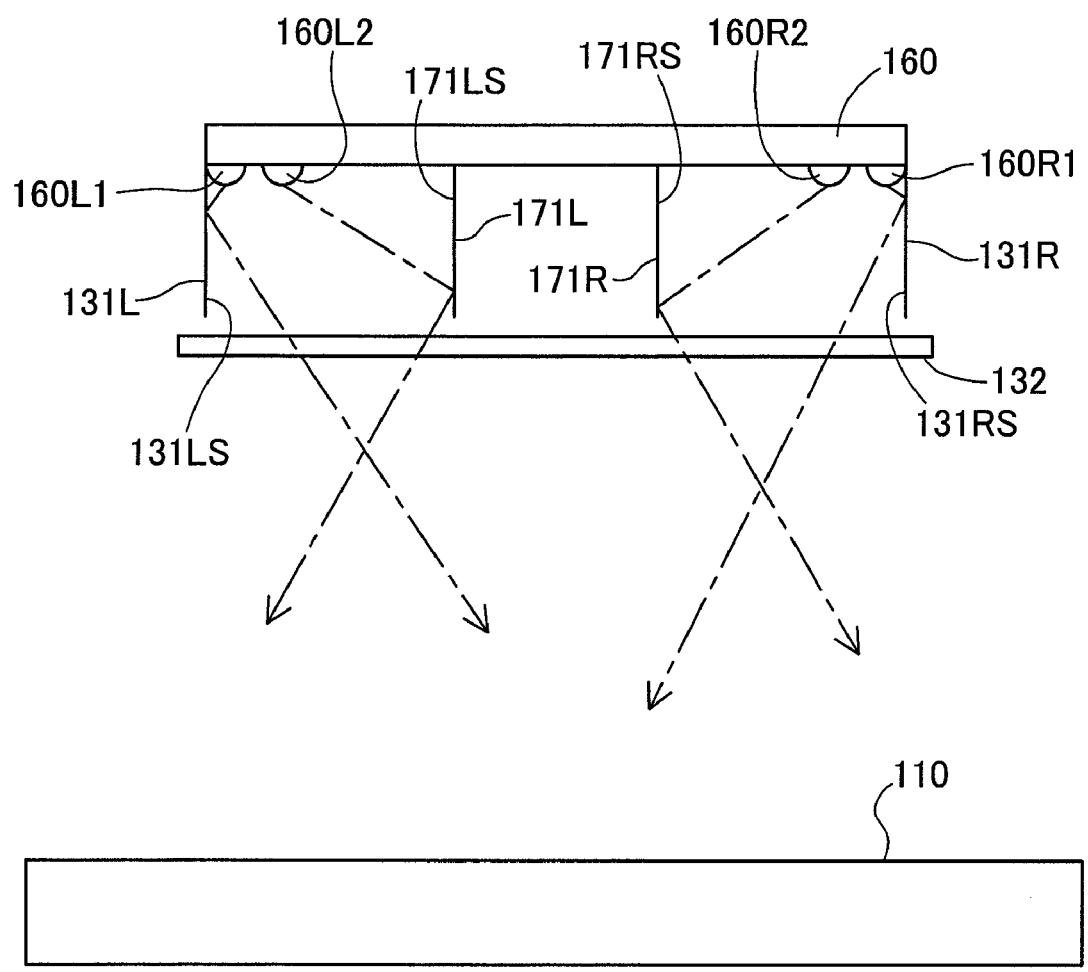
FIG. 6 is an illustration depicting in model form emission of light from LED light sources in front view, with all of the LED light sources lit.
Figure 7:
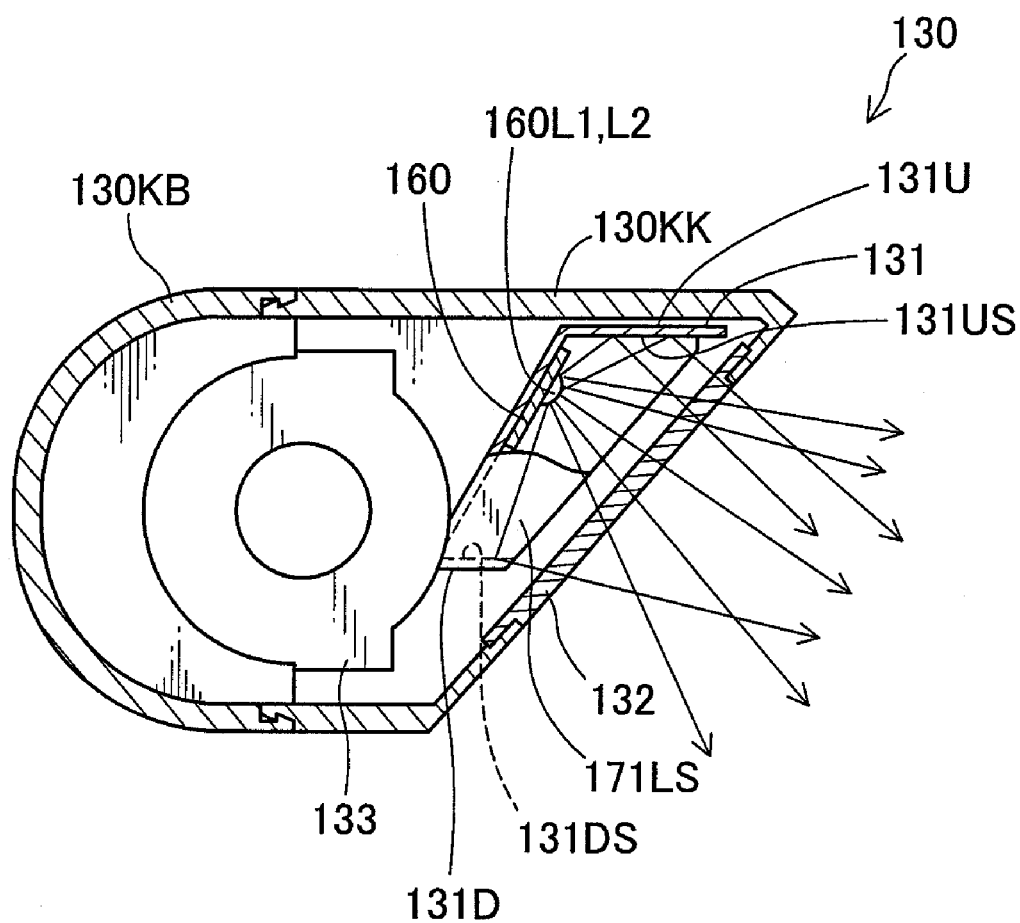
FIG. 7 is an illustration depicting in model form emission of light from LED light sources viewed from the sideways direction, with all of the LED light sources lit.

When the illumination switch of the switch group 112 depicted in FIG. 1 is operated, the illumination unit 130 having the configuration described above will turn on all of the LED light sources of the light source base plate 160, namely, the LED light sources 160L1 and L2 that are located between the left wall 131L of the light source housing portion 131 and the left wall 171L of the reflector 170, and the LED light sources 160R1 and R2 that are located between the right wall 131R of the light source housing portion 131 and the right wall 171R of the reflector 170. FIG. 6 is an illustration depicting in model form emission of light from LED light sources in front view, with all of the LED light sources lit, and FIG. 7 is an illustration depicting in model form emission of light from LED light sources viewed from the sideways direction, with all of the LED light sources lit.

As shown in the drawing, when the imaging device 100 of this embodiment is used during imaging the imaging-object, the illumination unit 130 will light up all of the LED light sources 160L1, L2 and the LED light sources 160R1, R2 provided to the linear light source array, and will direct the light emitted by the LED light sources onto the table upper face 110 to illuminate the table upper face. In carrying out this illumination process, while the illumination unit 130 has LED light sources in the form of a linear light source array on the light source base plate 160, the LED light sources 160L1, L2 and the LED light sources 160R1, R2 have been provided only at the left and right ends of the light source base plate 160. That is, despite the light source array being of linear form, the placement frequency of the LED light sources is lower in the center zone of the light source array, while the light source placement frequency is higher in zones to the left and right of this zone. With regard to light from the LED light source 160L1 and the LED light source 160R1 situated at the ends of the linear light source array in the left and right zones of higher placement frequency, as shown in FIG. 6, this light will be reflected respectively by the left inside wall face 131LS and the right inside wall face 131RS of left wall 131L and the right wall 131R which project out from the light source base plate 160 to the outside of these LED light sources, and will be directed towards the table upper face. Therefore, the quantity of light reaching the table upper face can be increased, despite the LED light sources 160L1, L2 and the LED light sources 160R1, R2 being situated only at the left and right ends of the light source base plate 160.

Moreover, with regard to the LED light source 160L2 and the LED light source 160R2 situated to the outside of the reflector 170 which has been disposed in the center zone of the light source array where the light source placement frequency is lower, as shown in FIG. 6, light that these light sources emit towards the outside of the table upper face beyond the table center zone of the table upper face will be reflected respectively by the left outside wall face 171LS and the right outside wall face 171RS of left wall 171L and the right wall 171R which project out from the light source base plate 160 at locations to the outside of the aforementioned light sources, and will be directed towards the table upper face. Thus, some of the light directed towards the table center zone from the LED light source 160L2 and the LED light source 160R2 situated to the outside of the reflector 170 can be directed on to the table upper face away from the table center zone. As a result, with the imaging device 100 having the illumination unit 130 according to this embodiment, in conjunction with directing of light emitted by the LED light source 160L1 and the LED light source 160L2 situated at the ends of the linear light source array towards the table upper face from the outside of the table upper face, more uniform brightness can be produced on the table upper face. Moreover, since such more uniform brightness can be achieved despite LED light sources being absent in the center zone of the light source array, the number of parts can be reduced commensurately with the absence of light sources, which contributes to power savings as well. Additionally, since it suffices to simply turn on the LED light sources 160L1 and L2 and the LED light sources 160R1 and R2, on/off control of the LED light sources is not needed, and control will be simple.

Also, in this embodiment, by providing the light source base plate 160 with the reflector 170 and not providing light sources in the center zone of the light source array where the light source placement frequency is low, the number of parts can be reduced further.

Moreover, in this embodiment, the light source base plate 160 having the LED light sources 160L1 and L2 and the LED light sources 160R1 and R2 at either end of the linear light source array is housed within the light source housing portion 131 of recessed shape, whereby the light from the LED light sources will be reflected not only by the left inside wall face 131LS, the right inside wall face 131RS, the left outside wall face 171LS, and the right outside wall face 171RS, but also by the upper inside wall face 131US and the lower inside wall face 131DS of the upper wall 131U and the lower wall 131D at the base plate top and bottom, and the reflected light will be directed through the window 132 and towards the table upper face 110 as shown in FIG. 7. A sufficient quantity of light can be ensured and the effectiveness of uniform brightness can be enhanced on the table upper face 110.

While the present invention has been shown hereinabove through certain preferred embodiments, no limitation is imposed thereby, and various other modes of embodiment are possible within the scope and spirit of the invention. For example, when arranging the LED light sources in a line, in this embodiment, the reflector 170 is installed in the center zone of the light source array, and not even a single LED light source is present at the installation location, however, one or two LED light sources could be incorporated in the reflector 170. Also, while the LED light sources have been arranged in a line, the LED light sources could also be positioned on the base plate in an arrangement in which they are lined up in an undulating pattern.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An imaging device comprising:
   a camera unit for imaging an area of a table on which an imaging-object is to be mounted, and
   an illumination unit for illuminating a table upper face during imaging, wherein the illumination unit includes:
      a plurality of light sources composed of light emitting diodes disposed as a light source array on a base plate such that light will be directed onto the table upper face, with the plurality of light sources being positioned on the base plate such that, in a center light source array zone and in light source array zones to left and right of the center light source array zone of the light source array, a placement frequency of the light sources in the left and right light source array zones is higher than a placement frequency in the center light source array zone;
      end reflector plates projecting from the base plate and adapted to reflect towards the table upper face light that is emitted towards outside of the table upper face by light sources situated at ends of the left and right light source array zones; and
      center end reflector plates projecting from the base plate at ends of the center light source array zone and adapted to reflect towards the table upper face light that is emitted towards outside of the table upper face beyond a table center zone of the table upper face by light sources situated outside of the center light source array zone.

2. The imaging device in accordance with claim 1 wherein the center light source array zone has no light sources.

3. The imaging device in accordance with claim 2 wherein the plurality of light sources are positioned on the base plate as a linear light source array in which light sources are arrayed in a row.

4. The imaging device in accordance with claim 1, wherein the illumination unit further includes:
   a recess-forming body covering the base plate and open to a front side of the light sources of the base plate; and
   a housing that has a light transmission window facing a recess opening of the recess-forming body; and
   the recess-forming body includes the end reflector plates at either side of the base plate as recess side walls of the recess-forming body, with upper and lower wall faces of the recess opening being reflecting faces.

5. An imaging device comprising:
   a camera unit for imaging an area of a table on which an imaging-object is to be mounted, and
   an illumination unit for illuminating a table upper face during imaging, wherein the illumination unit includes:
      a plurality of light sources composed of light emitting diodes disposed as a light source array on a base plate such that light will be directed onto the table upper face, with the plurality of light sources being positioned on the base plate such that, in a center light source array zone and in light source array zones to left and right of the center light source array zone of the light source array, a placement frequency of the light sources in the left and right light source array zones is higher than a placement frequency in the center light source array zone;

a recess-forming body covering the base plate and open to a front side of the light sources of the base plate; and a housing that has a light transmission window facing a recess opening of the recess-forming body; and the recess-forming body includes the end reflector plates at either side of the base plate as recess side walls of the recess-forming body, with upper and lower wall faces of the recess opening being reflecting faces.

* * * * *

UNITED STATES PATENT AND TRADEMARK OFFICE
CERTIFICATE OF CORRECTION

| | | |
|---|---|---|
| PATENT NO. | : 7,665,856 B2 | Page 1 of 1 |
| APPLICATION NO. | : 12/257816 | |
| DATED | : February 23, 2010 | |
| INVENTOR(S) | : Shinjo Ono et al. | |

It is certified that error appears in the above-identified patent and that said Letters Patent is hereby corrected as shown below:

Title page 1, in item "(*) Notice," the following sentence is deleted:

"This patent is subject to a terminal disclaimer.".

Signed and Sealed this

Sixth Day of July, 2010

David J. Kappos
*Director of the United States Patent and Trademark Office*